(12) United States Patent
Lau et al.

(10) Patent No.: US 9,633,195 B2
(45) Date of Patent: Apr. 25, 2017

(54) AUTHENTICATION APPARATUS AND METHODS

(71) Applicant: LABEL TECH INTERNATIONAL TRIMS LIMITED, Kwun Tong, Kowloon (HK)

(72) Inventors: Tak Wai Lau, Kowloon (HK); Wing Hong Lam, Kowloon (HK)

(73) Assignee: Label Tech International Trims Limited, Kowloon (HK)

( * ) Notice: Subject to any disclaimer, the term of this patent is extended or adjusted under 35 U.S.C. 154(b) by 30 days.

(21) Appl. No.: 14/404,574

(22) PCT Filed: May 30, 2013

(86) PCT No.: PCT/IB2013/054462
§ 371 (c)(1),
(2) Date: Nov. 28, 2014

(87) PCT Pub. No.: WO2013/179249
PCT Pub. Date: Dec. 5, 2013

(65) Prior Publication Data
US 2015/0121512 A1 Apr. 30, 2015

(30) Foreign Application Priority Data

May 30, 2012 (HK) ................................. 12105264.4
Oct. 30, 2012 (HK) ................................. 12110844.3

(51) Int. Cl.
*G06F 21/44* (2013.01)
*H04W 12/06* (2009.01)
(Continued)

(52) U.S. Cl.
CPC ............. *G06F 21/44* (2013.01); *G06K 9/522* (2013.01); *G07D 7/205* (2013.01); *H04W 12/06* (2013.01)

(58) Field of Classification Search
CPC ........ G06F 21/44; G06F 21/36; H04W 12/06; G07D 7/205; G06K 9/522
See application file for complete search history.

(56) References Cited

U.S. PATENT DOCUMENTS 6,694,872 B1 * 2/2004 LaBelle ................. B41F 19/02
101/23
7,054,461 B2 * 5/2006 Zeller ................... G06T 1/0078
382/100

(Continued)

FOREIGN PATENT DOCUMENTS

CN 101286195 A 10/2008
CN 101616000 A 12/2009

OTHER PUBLICATIONS

Pathak et al., Improving supply chain robustness and preventing counterfeiting through authenticated product labels, Nov. 2010, IEEE International Conference on Technologies for Homeland Security, pp. 35-41.*

(Continued)

*Primary Examiner* — Kenneth Chang
(74) *Attorney, Agent, or Firm* — Nixon Peabody LLP; Jeffrey L. Costellia

(57) ABSTRACT

A method of and an apparatus for verifying authenticity of a target authentication device comprising a reference pattern having a characteristic frequency and a security pattern, the security pattern comprises an embedded security device that is coded with phase modulation information. The method comprises extracting frequency domain data from an image of the target authentication device to facilitate verification of authenticity of the target authentication device. The method provides a very effective end expedient mechanism for verifying authenticity of a moiré or moiré like authentication device to combat counterfeiting.

18 Claims, 8 Drawing Sheets

(51) Int. Cl.
*G06K 9/52* (2006.01)
*G07D 7/20* (2016.01)

(56) References Cited

U.S. PATENT DOCUMENTS

| | | | |
|---|---|---|---|
| 7,366,301 B2 * | 4/2008 | Huang | G06T 1/0071 283/113 |
| 2002/0012447 A1 * | 1/2002 | Amidror | G07D 7/128 382/100 |
| 2006/0003295 A1 * | 1/2006 | Hersch | B42D 25/342 434/110 |
| 2006/0119876 A1 * | 6/2006 | Kenner | G07D 7/2058 358/1.14 |
| 2008/0159615 A1 * | 7/2008 | Rudaz | G06T 1/005 382/137 |
| 2010/0034238 A1 | 2/2010 | Bennett | |
| 2013/0015236 A1 * | 1/2013 | Porter | G06F 21/645 235/375 |

OTHER PUBLICATIONS

International Search Report for PCT/IB2013/054462 Dated Nov. 7, 2013.

\* cited by examiner

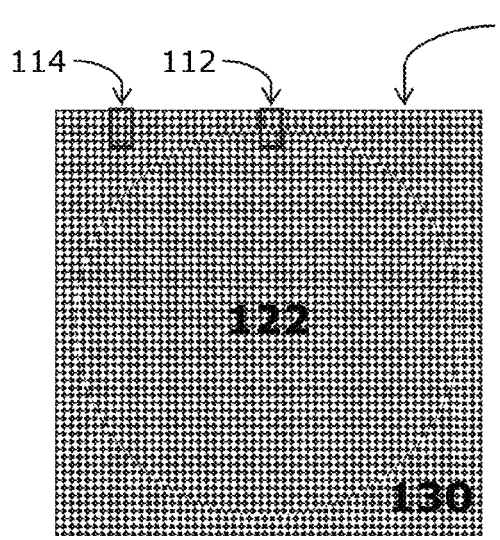
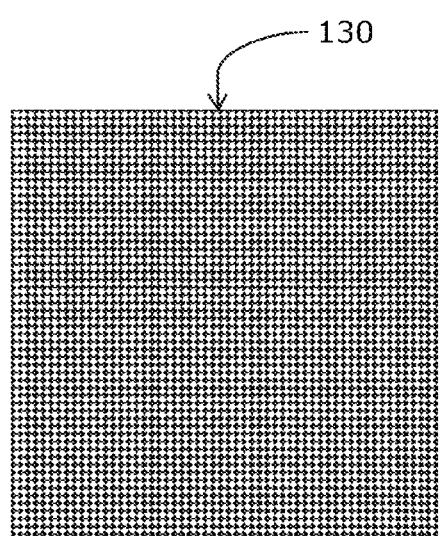
Fig. 1　　　　　　　　　Fig. 1A
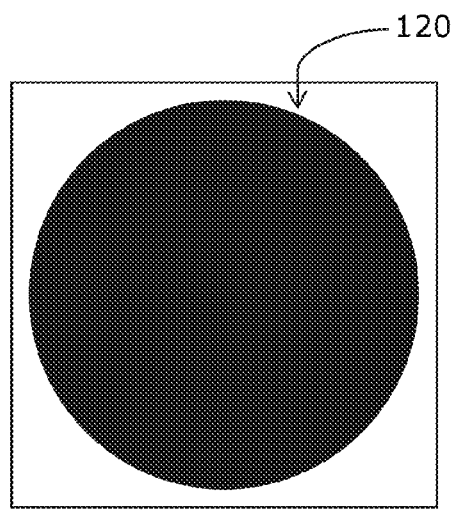
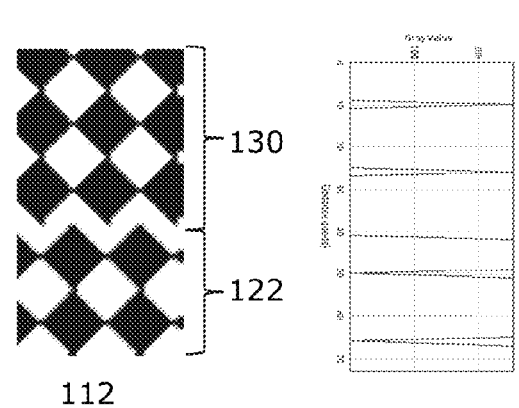
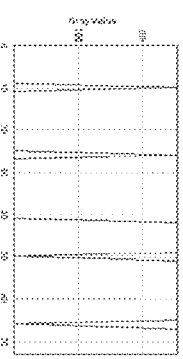
Fig. 1B　　　　Fig. 1D　　　Fig. 1D1
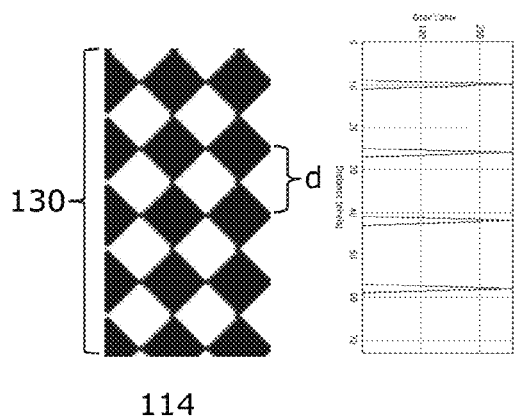
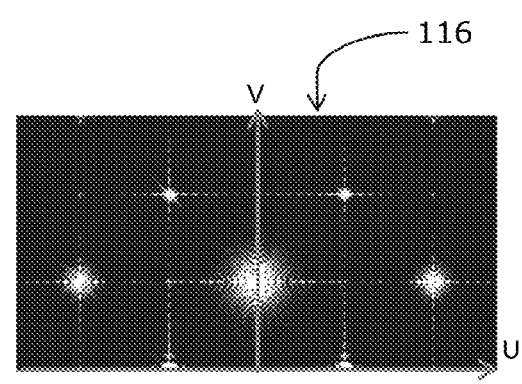
Fig. 1E　　　Fig. 1E1　　　Fig. 1F

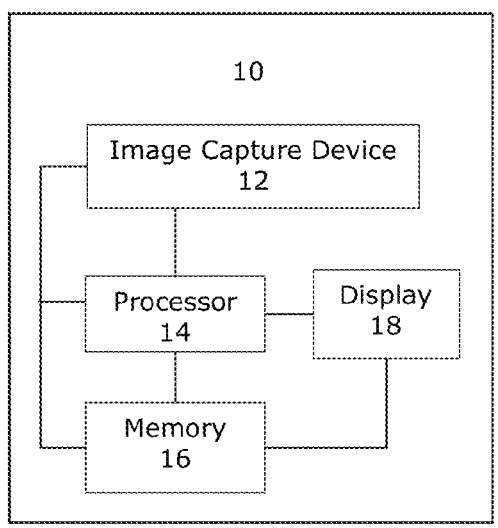
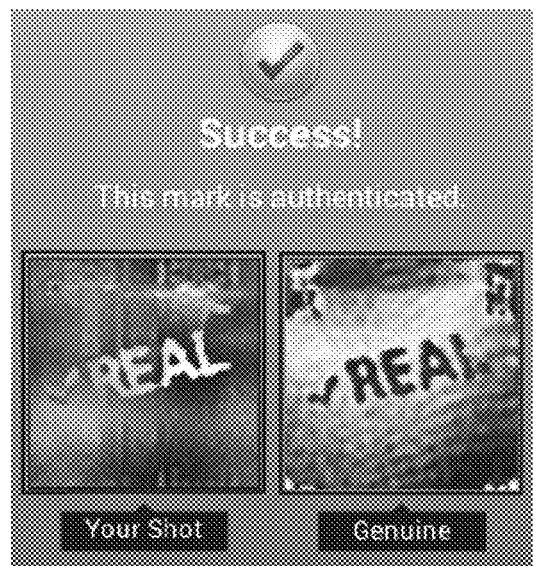
Fig. 5
Fig. 5C
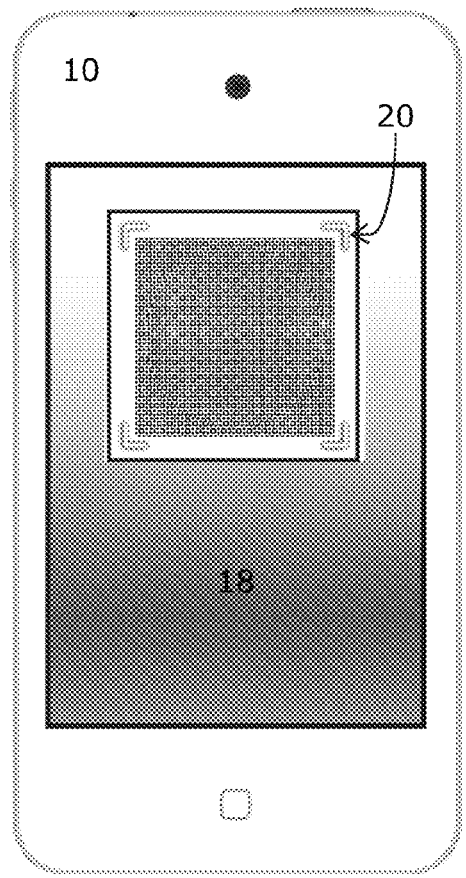
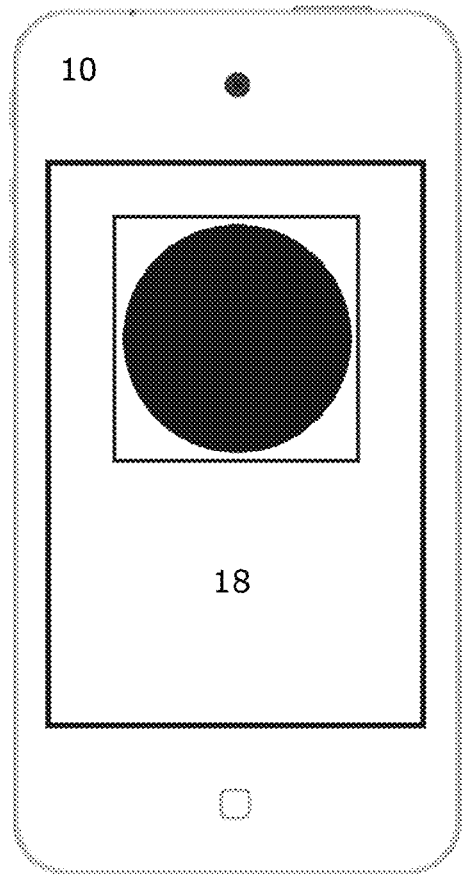
Fig. 5A
Fig. 5B

AUTHENTICATION APPARATUS AND METHODS

FIELD

The present disclosure relates to authentication apparatus and methods, and more particularly to authentication of authentication devices comprising a phase modulation coded security device.

BACKGROUND

Counterfeiting is a serious problem around the world which not only disrupts normal commercial or non-commercial activities but also poses safety as well as security issues to the general public. Many types of anti-counterfeiting measures are dedicated to help fight counterfeiting. For example, genuine goods carry authentication devices such as authentication tags or codes to help verify authenticity of goods or products. However, even such authentication tags or codes can become the subject of rampant counterfeiting and enhanced security measures to combat counterfeiting are desirable.

High precision authentication devices such as those comprising phase modulation coded security patterns are very useful in combating counterfeiting because phase modulation coded information subsisting in the security patterns are very sensitive and are difficult to counterfeit. The moiré pattern is a good example of authentication devices comprising phase modulation coded security patterns which has been widely used to enhance reliability of authentication devices. The term 'authentication device' in the present context generally means authentication device for use in combating counterfeiting.

While phase modulation coded security patterns such as moiré or moiré-like patterns are a very useful anti-counterfeiting tool, their highly precise or delicate properties make them difficult to use for many applications such as consumer or retail applications.

U.S. Pat. No. 7,561,308 discloses a method of decoding a digitally encoded image which is embedded in a moiré or moiré like pattern using a sampling approach. The method includes taking a series of elongate rectangular image content samples from the digitized encoded image at a frequency corresponding to the line frequency used to encode the encoded image, in which the samples are oriented at the encoding angle used to encode the encoded image. This method requires the prior knowledge of the encoding line frequency and orientation angle α, and the quality of the resulting decoded image is not entirely satisfactory due to, for example, presence of residual encoding lines in the decoded image.

It would be advantageous if enhanced means to perform verification of security devices such as those utilizing proportions of moiré patterns can be provided.

DESCRIPTION OF FIGURES

The disclosure will be described by way of non-limiting example with reference to the accompanying Figures, in which:—

FIG. 1 depicts an example authentication device,
FIG. 1A depicts an example background pattern of the authentication device of FIG. 1,
FIG. 1B depicts a security device to be integrated into the background pattern of FIG. 1A to form the authentication device of FIG. 1,
FIGS. 1D1 and 1E1 are grey scale spatial diagrams of FIGS. 1D and 1E respectively,
FIG. 1F is a graphical representation of frequency domain data of the authentication device of FIG. 1,
FIGS. 3D1 and 3E1 are grey scale spatial diagrams of FIGS. 3D and 3E respectively,
FIG. 4B1 depicts a security device to be integrated into the authentication device of FIG. 4,
FIG. 4B2 depicts a background pattern to be integrated into the authentication device of FIG. 4,
FIG. 5 is a block diagram of an example authentication apparatus,
FIG. 5A depicts an image of an authentication device aligned with a visual guide on the authentication apparatus of FIG. 5,
FIG. 5B depicts a visual representation of a security device on the authentication apparatus of FIG. 5,
and FIG. 5C depicts an example graphical interface of the authentication apparatus of FIG. 5.

DESCRIPTION

Figure 1C:
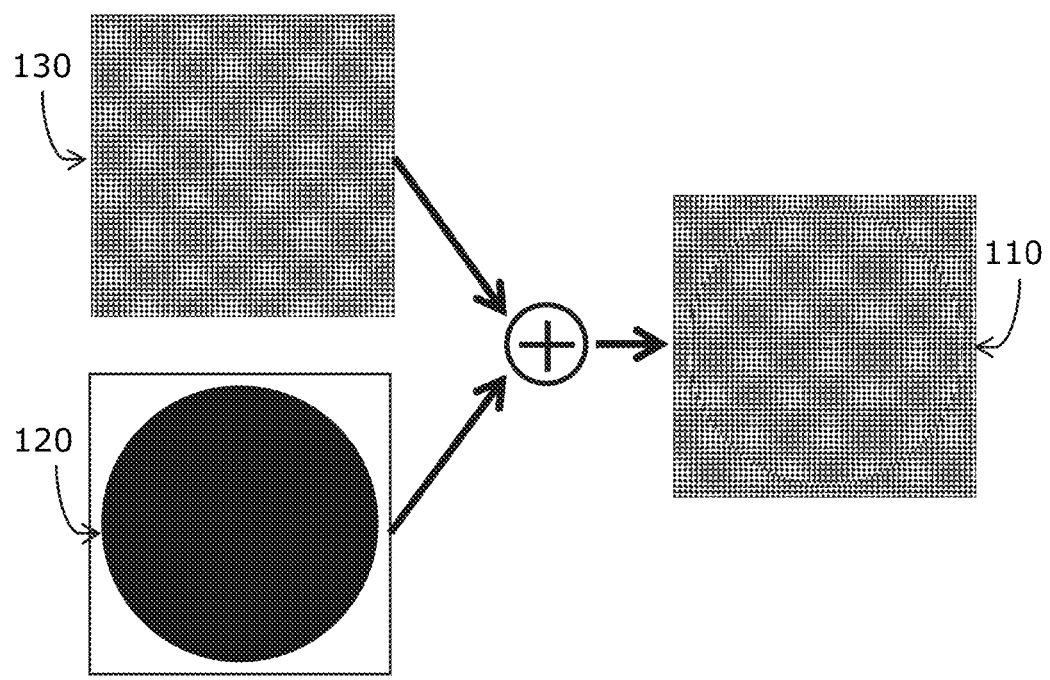
FIG. 1C is a schematic diagram depicting combining or integrating the security device of FIG. 1B with the background pattern of FIG. 1A to form the authentication device of FIG. 1,
FIGS. 1D and 1E depict enlarged portions of the authentication device respectively at a boundary location at which the security pattern interfaces with the background pattern and at the background pattern.

An authentication method and an authentication apparatus for verifying authenticity of a target authentication device comprising a reference pattern and a security pattern comprising an embedded security device that is coded with phase modulation information of a characteristic frequency is disclosed herein. The method comprises obtaining frequency domain data from an image of the target authentication device to extract the phase modulation information for verification of authenticity of the target authentication device.

For example, the phase modulation information may be utilised to recover the whole or a salient portion of the security device to facilitate verification of authenticity.

This authentication method is advantageous because it does not require prior knowledge on the characteristic frequency as the characteristic frequency is already in the frequency domain data and is readily available for use. Because the phase modulation information is characteristic of the security device, the security device or portion thereof thus extracted will be more accurate and suitable for authentication applications.

The frequency domain data may be obtained by transforming spatial domain pixel data of an image of the authentication device into frequency domain.

A visual image of the security device may be formed or constructed from the extracted phase modulation information for display to enable a user to perform visual verification. The extracted phase modulation information may be processed to facilitate machine verification of the authenticity of the embedded security device. For example, salient features of the security device such as its shape or outline may be extracted by a processor to examine and verify authenticity.

An advantage of this authentication method is that the security device can be extracted free or substantially free of the reference pattern because the phase modulation information is characteristic of the security device. Extraction of the security device would be beneficial for human verification as the security device may contain a human perceivable message.

In an example, the phase modulation information comprise information on relative phase shift between the security pattern and the reference pattern, and the method is to extract the information on relative phase shift to recover the whole or a salient portion of the security device facilitate verification of authenticity.

The method may comprise offsetting the frequency domain data by the characteristic frequency, inverse transforming the frequency domain data back into spatial domain data after the characteristic frequency offset, and then extracting phase information and/or magnitude information from said spatial domain data to facilitate verification of authenticity. By processing the frequency domain data with reference to the characteristic frequency which is due to the reference pattern, the reference pattern is digitally filtered off.

The method may comprise devising a visible outline of said security device from the extracted phase information for display and/or devising a visible filled pattern of said security device from the extracted magnitude information for display.

The authentication device may comprise pattern defining elements such as dots, lines, or other patterns, which are distributed to collectively define the characteristic frequency and the visible representation is substantially free of the pattern defining elements. The characteristic frequency is typically determined by the pitch or spacing between adjacent pattern defining elements of the authentication device. As the characteristic frequency is a specific property of the authentication device, the terms 'characteristic frequency' and 'reference frequency' are interchangeably use herein where appropriate.

The security pattern and the reference pattern may be in abutment, and the abutment delineates a boundary interfacing resembling that of a moiré pattern. The method may comprise digitally filtering the characteristic frequency before extracting the phase modulation data to facilitate verification of authenticity.

The security pattern may be surrounded by the reference pattern or vice versa, and the security pattern may be detached from the reference pattern.

As the reference pattern does not contain security information other than the characteristic frequency, the terms 'background pattern' and 'reference pattern' are interchangeably used herein where appropriate.

The method or features of it can be implemented by software, hardware, firmware, or a combination thereof. The method is suitable for implementation on kiosks or POS (point of sales) terminals and computational devices, particularly mobile devices, such as mobile phones, smart phones, notebook computers and tablet computers.

Therefore, there is provided an authentication apparatus which comprises a processor to implement the above authentication method. The processor is to process an image of the target authentication device to verify authenticity. The processor is to extract frequency domain data from an image of the target authentication device to obtain the phase modulation information to facilitate verification of authenticity of the target authentication device.

An example authentication device 110 is depicted in FIG. 1. The authentication device 110 comprises a security pattern 122 of a security device 120 and a background pattern 130. The background pattern 130 comprises a matrix of tiny dots which are distributed on a plain background. Each of the tiny dots is a dark spot and the tiny dots on the background pattern are distributed along a first axis (x) and a second axis (y) orthogonal to the first axis. The separation distance between adjacent dots on an axis is referred to as the interval or pitch d. The x-axis defines an x-direction and the pitch in the x-direction is represented by the symbol $d_x$. The y-axis defines a y-direction and the pitch in the y-direction is represented by the symbol $d_y$. For the background pattern of FIG. 1, the separation distances between adjacent dots in the x-direction and the y-direction are the same and equal d, and the associated spatial frequency $\omega$ is $\omega=2\pi/d$.

The background pattern 130 can be represented by a spatial domain function with respect to its intensity profiles as below:

$$x(n_1, n_2) = \begin{cases} 1, & \text{if } \sin(\omega n_1) + \sin(\omega n_2) > 0 \\ 0, & \text{otherwise} \end{cases}$$

In the above spatial domain function, for an image with $N_1 \times N_2$ pixels, the pixel coordinates $n_1=0, 1, \ldots, N_1-1$ and $n_2=0, 1, \ldots, N_2-1$.

As the background pattern comprises regularly spaced periodic dots, the background pattern can be represented by a discrete Fourier series as below:

$$X(k_1, k_2) = \sum_{n_1=0}^{N_1-1} \sum_{n_2=0}^{N_2-1} x(n_1, n_2) W_{N_1}^{n_1 k_1} W_{N_2}^{n_2 k_2}$$

In the above discrete Fourier series, $$W_{N_1} = \exp\left(-\frac{j2\pi}{N_1}\right) \text{ and } W_{N_2} = \exp\left(-\frac{j2\pi}{N_2}\right)$$

are basis functions, where $j=\sqrt{-1}$. The Fourier domain frequency coordinates $k_1=0, 1, \ldots, N_1-1$ and $k_2=0, 1, \ldots, N_2-1$.

The discrete Fourier series above can be obtained by frequency domain transformation of the spatial domain function above.

As depicted in FIG. 1C, the authentication device 110 is a result of integration or merging of the security device 120 and the background pattern 130. As depicted in FIGS. 1B and 1C, the security device 120 comprises a solid circular region which when integrated into background pattern 130 will generate the security pattern 122. Integration of the security device into the background pattern can be done, for example, by spatially shifting the dots in the background pattern according to the security device pattern, in which an area defined by the security device 120 will undergo phase modulation with respect to the phase of the background pattern to generate the security pattern 122. As a result of the phase modulation, a boundary interfacing is readily apparent and visible in the dotted pattern of FIG. 1. The boundary interfacing is substantially a circular fringe having a somewhat zigzag appearance characteristic of a moiré pattern. Although the boundary interfacing is somewhat zigzag, it is substantially circular due to the circular shape of the security pattern which is associated with the security device 120 and which has contributed to the formation of the circular security pattern 122 of the authentication device 110.

The zigzag circular fringe portion divides the authentication device 110 of FIG. 1 into two portions, namely, a first portion of the security pattern 122 and a second portion of the background pattern 130 surrounding the security pattern 122.

In the enlarged excerpted portion 112 of the authentication device 110 as depicted in FIG. 1D and the associated grey scale representation of FIG. 1D1, there is an apparent discontinuity in the shape of the dots at the boundary interfacing between the background pattern 130 and the security pattern 122 which is indicative of a phase difference between the patterns of the same pitch d. In the enlarged excerpted portion 114 of the authentication device 110 as depicted in FIG. 1E and the associated grey scale representation of FIG. 1E1, there is no such discontinuity since the entire excerpted portion is from the background pattern 130. In the grey scale diagram of FIGS. 1D1 and 1E1, zero (0) intensity is assigned to white or not-coloured while the maximum grey level of 255 is assigned to black.

A moiré pattern or a moiré like pattern is useful for applications in verification of authenticity since the boundary interfacing characteristics such as that depicted in portion 112 are very precise and are not easily counterfeited as many sensitive authentication information will be lost during an ordinary course of reproduction.

In actual use, the authentication device 110 is to be incorporated onto an article such as a tag or a label accompanying a product. When it is desirable to verify the authenticity of a product at a warehouse or at a point-of-sale such as a shop, a customer or an operator will examine the authentication device 110 associated with that product by capturing an image of the authentication device for machine verification.

An example machine verification process comprises transforming a captured image of the authentication device comprising spatial domain data into frequency domain data. Where the image is captured by a digital device such as a digital camera or a smart phone, the captured image will be stored as a file of pixel data comprising specific intensity or grey scale values in the spatial domain. The digitally stored spatial domain data can be readily transformed into frequency domain data by digital signal processing techniques such as FFT (Fast Fourier Transform) or DFT (Discrete Fourier Transform).

A frequency domain series $X(k_1,k_2,\theta)$ of the authentication device 110 obtained by DFT is set out below, in which $\theta$ is the angle of the security device pattern with respect to reference pattern:

$$X(k_1, k_2, \theta) = \sum_{n_1=0}^{N_1-1} \sum_{n_2=0}^{N_2-1} x(n_1, n_2, \theta) W_{N_1}^{n_1 k_1} W_{N_2}^{n_2 k_2}$$

A graphical representation 116 of the frequency domain data of the authentication device 110 obtained by DFT is depicted in FIG. 1F, in which the u-axis represents the "horizontal frequency" or the frequency components in the x-direction while the v-axis represents the "vertical frequency" or the frequency components in the y-direction. In the graphical representation of FIG. 1F, a DFT coefficient having a high magnitude will appear as a bright spot, and the higher the magnitude the brighter the spot. As a DFT coefficient is associated with a specific frequency component, the salient bright spots on the DFT graph of FIG. 1 correspond to the characteristic frequency since both the background pattern and the security pattern have the same frequency.

As an aspect of the security device 120 is embedded in the authentication device 110 as an authentication key by using phase modulation coded security information, extraction of the phase modulation coded security information from the authentication device would be useful for verification of authenticity.

In an example process to extract the phase modulation coded security information from the authentication device 110, the reference frequency axes u, v are shifted to a new reference frequency axes u', v' such that the characteristic frequency $f_1$, $f_2$ will become a new reference frequency or frequency origin for signal processing. In signal processing terms, the reference frequency axes u, v are shifted to a new reference frequency axes u', v' such that the new origin of u' axis is equal to the old origin u shifted to the right by the value $f_1$ and the new origin of v' axis is equal to the old origin v shifted upwards by the value $f_2$. The resultant off-set in frequency axes during signal processing is graphically represented in the frequency domain data diagram 118 of the authentication device 110. Although, both the u and v axes can be shifted in theory. For example, the u-offset-frequency and v-offset-frequency may be added vectorially to form a single frequency in one direction. Hence, by rotating the Fourier diagram such that the rotated v-axis points in that direction, shifting only the rotated u-frequency axis is sufficient. For simplicity, only the u-axis is shifted while the v-axis in the examples is not shifted in the present example.

As a result of the shift or offset in the reference axes such that $k_1'=k_1-f_1$ and $k_2'=k_2-f_2$, the series expression of $X(f_1, f_2,\theta)$ under the old reference axes will become $X'(0,0,\theta)$ under the new reference axes since the first and second variables in the bracket are nullified in the new series due to reference frequency offset to $k_1'$ & $k_2'$, where $$X'(k1', k2', \theta) = $$
$$X(k1-f1, k2-f2, \theta) = \sum_{n_1=0}^{N_1-1} \sum_{n_2=0}^{N_2-1} x(n_1, n_2, \theta) W_{N_1}^{n_1(k_1-f1)} W_{N_2}^{n_2(k_2-f2)}$$

In passing, it is noted that only the positive v-axis frequency components have been used as the negative v-axis frequency components are mathematical by-products due to mirror symmetry of the frequency domain properties.

Figure 1G:
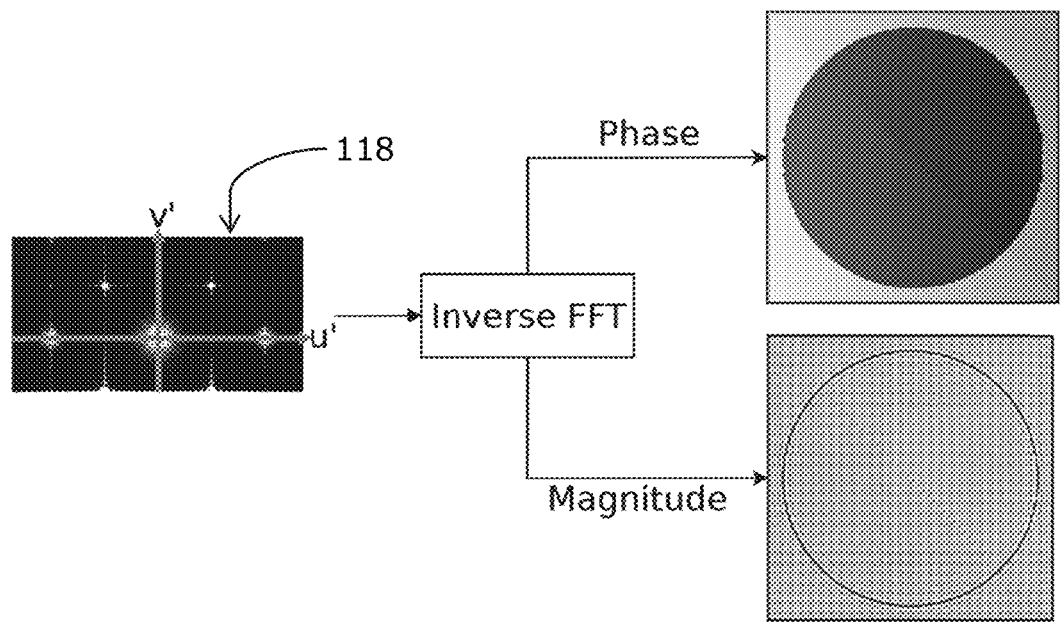
FIG. 1G is a schematic diagram depicting extracting relative phase and magnitude information by inverse Fast Fourier Transform using a reference axes shifting technique.

The following spatial domain function below will result when the above reference shifted frequency domain data are transformed into the spatial domain by inverse FFT as depicted in FIG. 1G. After inverse FFT, the function is complex with phase $\phi(n_1, n_2)$; hence, in general the spatial domain function is expressed as $$x''(n_1,n_2,\theta)=b_\theta(n_1,n_2)[\cos[\phi(n_1,n_2)]+j\sin[\phi(n_1,n_2)]]$$

The variable $z=x''(n_1,n_2,\theta)$ is a complex function having its following real (Re) and imaginary (Im) parts as follows:

$$\text{Re}=b_\theta(n_1,n_2)\cos[\phi(n_1,n_2)], \text{and}$$

$$\text{Im}=b_\theta(n_1,n_2)\sin[\phi(n_1,n_2)]$$

The magnitude and phase of the variable $z=x''(n_1,n_2,\theta)$ are as follows:

$$\text{Magnitude: } \|z\| = \sqrt{\text{Re}^2+\text{Im}^2} = b_\theta(n_1,n_2)$$

$$\text{Phase: } \arg(z) = \tan^{-1}\frac{\text{Im}}{\text{Re}} = \varphi(n_1,n_2)$$

The phase $\phi(n_1, n_2)$ of z above represents the phase shifting of the pattern of the portion 122 relative to the background pattern 130 and therefore the embedded phase modulation coded security information. As the portion of the authentication device having that relative phase shift is collectively representative of the portion due to embedment of the security device 120, identifying the phase shifted portion will be sufficient to define and re-construct the security device.

As a result of the shifting of the reference frequency axes in the above signal processing step, the frequency domain data $X'(k1', k2', \theta)$ are now relative to the new u'-v' axes. The reference axes are now shifted such that the data points in the Fourier domain are relative to or with respect to that of the frequency of the background pattern, and the background pattern becomes the frequency domain origin and the background pattern is not visible if this new set of relative frequency domain data is transformed into the spatial domain. The shifting of the reference axes effectively digitally filters the background pattern in the signal processing process to extract the security device.

Furthermore, because the relative frequency domain data are with respect to the background pattern, the security device can be re-constructed from the extracted phase shift information since all phase shifting remaining in the relative frequency domain data is due to the security device 120 and relative to that of the background pattern 130. Graphical representations of the relative phase data and relative magnitude data obtained by spatial domain transformation of the relative frequency domain data are depicted in FIG. 1G. In FIG. 1G, the solid circular portion in black in the phase part corresponds to the phase modulation coded information of the security device and the plain portion outside the solid portion corresponds to the phase of the background pattern 130 which is a reference pattern. The circular ring portion in black in the magnitude part of FIG. 1G signifies a region of abrupt change in frequency with respect to the reference or background frequency. As both the background pattern 130 and the security pattern 122 are built from the same pattern defining elements (that is, black dots) having the same pitch, the fundamental frequency is the same. Therefore, the circular ring portion which signifies an abrupt change in frequency is due to an abrupt transition between the background pattern 130 and the security pattern 122 and this circular ring portion therefore represents a boundary interface between the two patterns.

As the extracted phase and magnitude information are characteristic and/or definitive of a security device, they can be utilized either separately or jointly to facilitate verification of authenticity of a captured image of a target authentication device with reference to a reference security device. For example, the phase portion of the inverse FFT can be utilized to facilitate comparison with the area of a reference security device to verify authenticity, the magnitude portion can be utilized to facilitate comparison with the outline of a reference security device to verify authenticity, and the phase and magnitude can be utilized to compare both the area and outline with the reference security device without loss of generality. The comparison can be by for example by computationally checking that the extracted pattern from the security device is highly similar to the pattern of the reference security device or for visual examination by a user.

While the security device 120 is a filled circle, it should be appreciated that a filled circle is only a convenient example for illustration purposes, and neither a circle nor a filled device is necessary.

Figure 2:
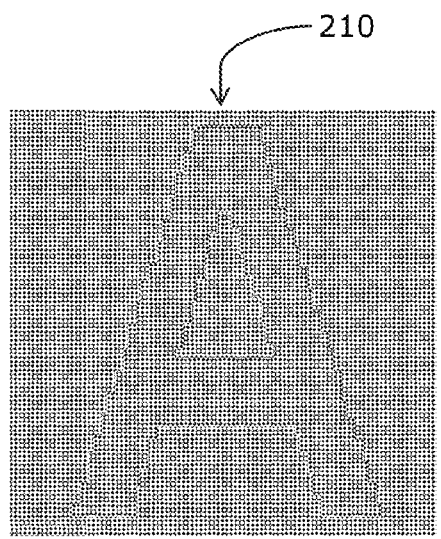
FIG. 2 depicts a second example authentication device.
Figure 2A:
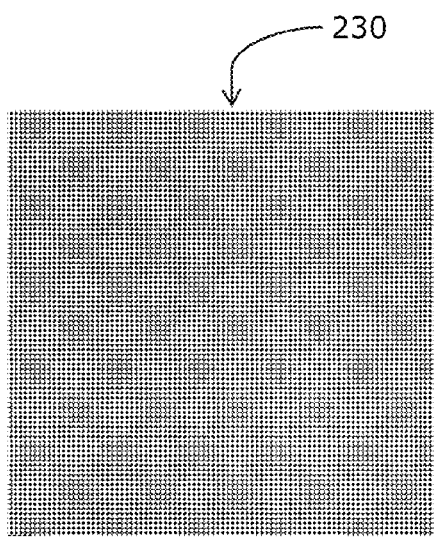
FIG. 2A depicts a second example background pattern of the authentication device of FIG. 2.
Figure 2B:
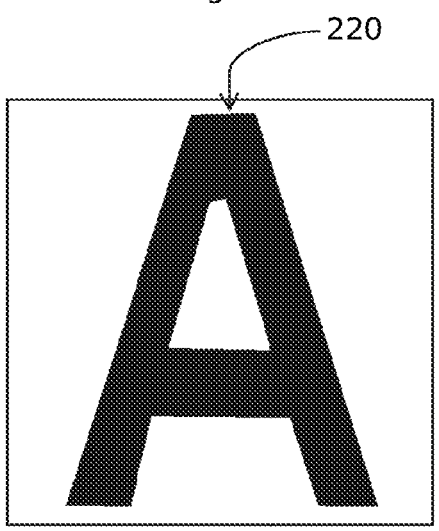
FIG. 2B depicts a security device to be integrated into the background pattern of FIG. 2A to form the authentication device of FIG. 2.

A second example of an authentication device 210 is depicted in FIG. 2. The authentication device 210 comprises a background pattern 230 of FIG. 2A and a more complex security pattern 222 generated by integrating the 'A' shaped security device 220 of FIG. 2B into the background pattern 230 by introducing a phase modulation coding into the region corresponding to the security pattern 222. Similar to the background 130, the background 230 comprises a matrix of dots having a constant pitch in both the x- and y-directions but the pitch has a different value. The 'A'-shaped security device 220 is neither rounded nor filled to illustrate an example variation to the security device 120.

Figure 2C:
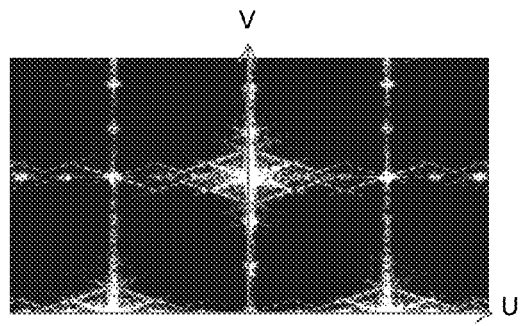
FIG. 2C is a graphical representation of frequency domain data of the authentication device of FIG. 2.
Figure 2D:
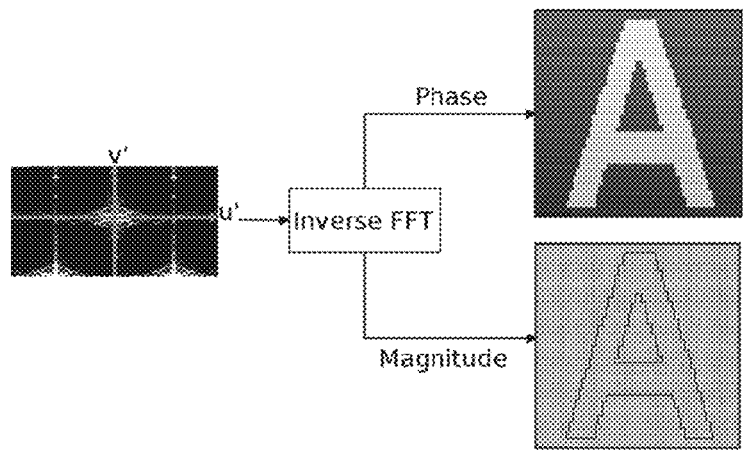
FIG. 2D is a schematic diagram depicting extracting relative phase and magnitude information by inverse Fast Fourier Transform using a reference axes shifting technique.

A graphical representation of the frequency domain data as depicted in FIG. 2C shows the characteristic frequency and the extracted phase and magnitude information using the reference axes shifting techniques above will generate the phase and magnitude data as depicted in FIG. 2D. It will be noted from FIG. 2D that a more complex security pattern 220 can be fully extracted by application of the same techniques.

Figure 3:
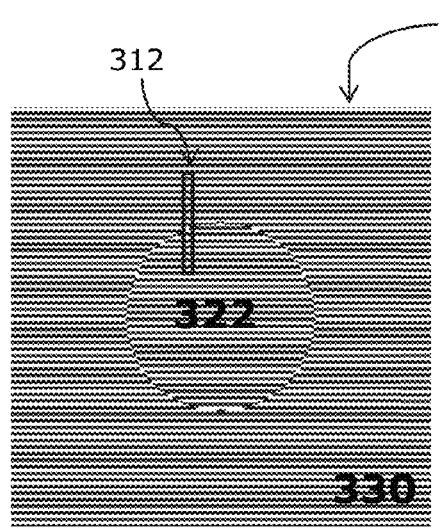
FIG. 3 depicts a third example authentication device.
Figure 3A:
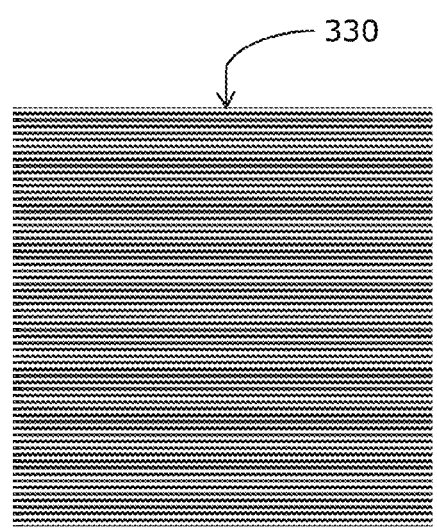
FIG. 3A depicts an example background pattern of the authentication device of FIG. 3.
Figure 3B:
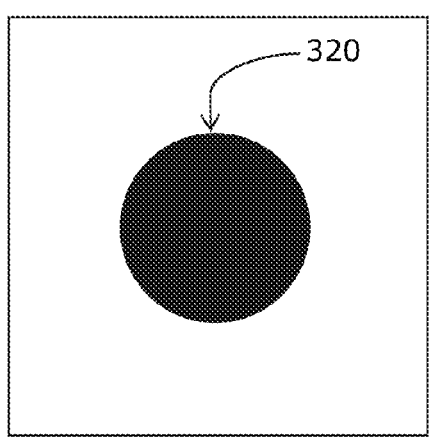
FIG. 3B depicts a security device to be integrated into the background pattern of FIG. 3A to form the authentication device of FIG. 3.
Figure 3D:
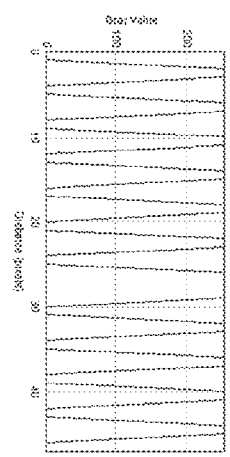
Figure 3E:
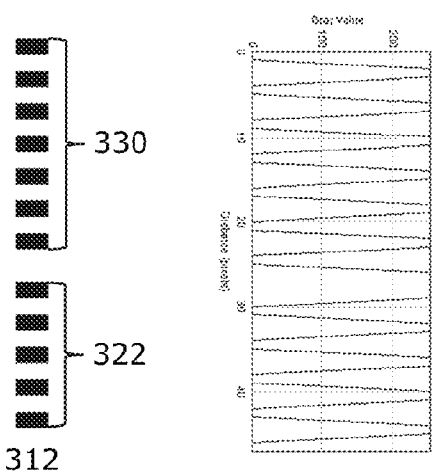
Figure 3E:
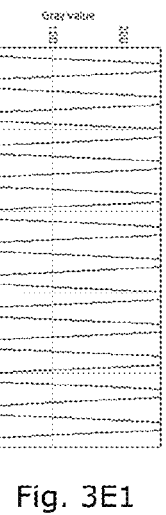

A third example of an authentication device 310 is depicted in FIG. 3. The authentication device 310 comprises a background pattern 330 of FIG. 3A and a security pattern 322 generated by integrating the security device 320 of FIG. 3B into the background pattern 330 as depicted in the process of FIG. 3C. The background pattern 330 comprises a number of horizontal lines extending in the x-direction and distributed at a constant spacing at a pitch d' along the vertical or y-direction. The pitch d' may be the same or different to that of the background 130. As the background pattern comprises straight lines extending in a single direction which is the y-direction, the spatial domain representation is simpler than that of the background pattern 130 and its spatial profile can be represented as below:

$$x(n_2) = \begin{cases} 1, & \text{if } \sin(\omega n_2) > 0 \\ 0, & \text{otherwise} \end{cases}$$

The background pattern 330 when transformed into the frequency domain can be represented by the Fourier series below.

$$X(k_1, k_2) = \sum_{n_1=0}^{N_1-1} \sum_{n_2=0}^{N_2-1} x(n_2) W_{N_1}^{n_1 k_1} W_{N_2}^{n_2 k_2}$$

Figure 3F:
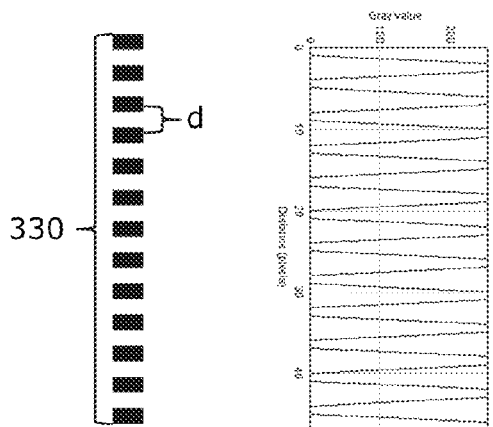
FIG. 3F is a graphical representation of frequency domain data of the authentication device of FIG. 3.
Figure 3F:
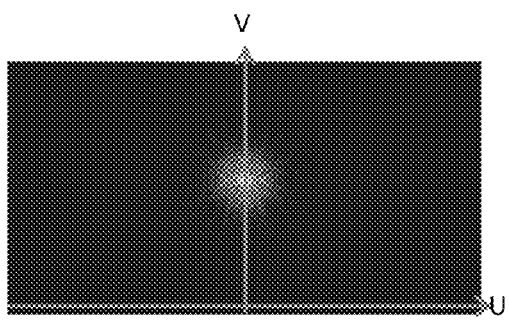
Figure 3C:
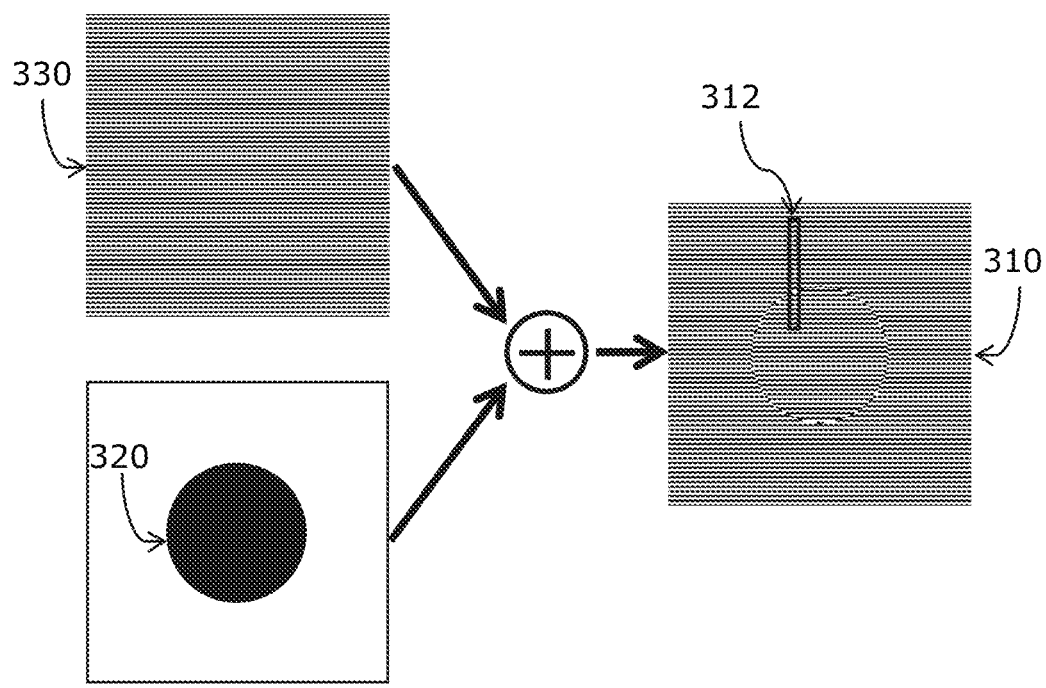
FIG. 3C is a schematic diagram depicting combining or integrating the security device of FIG. 3B and the background pattern of FIG. 3A to form the authentication device of FIG. 3,
FIGS. 3D and 3E depict enlarged portions of the authentication device respectively at a boundary location at which the security pattern interfaces with the background pattern and at the background pattern.
Figure 3G:
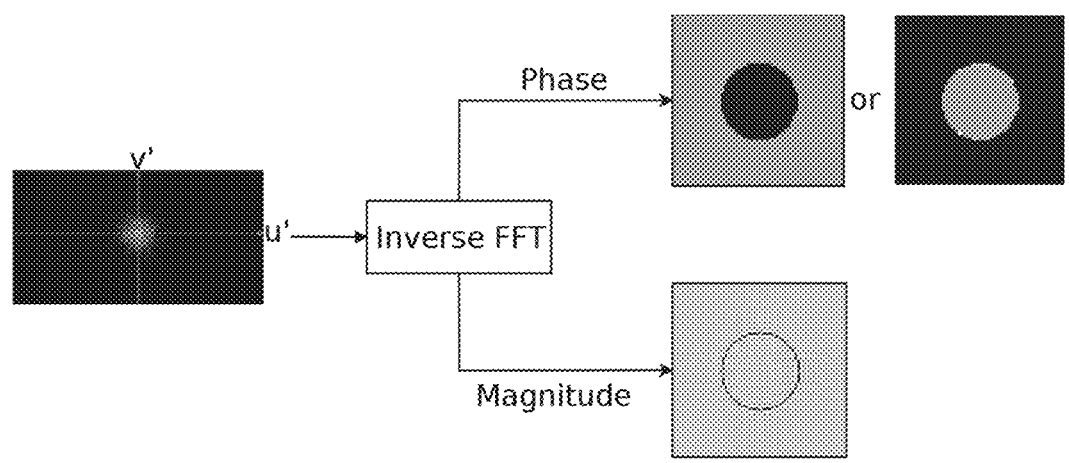
FIG. 3G is a schematic diagram depicting extracting relative phase and magnitude information by inverse Fast Fourier Transform using a reference axes shifting technique.

A graphical representation of the frequency domain data of the background pattern 330 as depicted in FIG. 3F shows that the characteristic frequency is on the v-axis. When applying the above reference axes shifting techniques to extract the phase modulation coded security information with reduced computation, only the v-axis is needed to be shifted upwards to facilitate extraction of the security information as depicted in FIG. 3G after digitally filtering off the background pattern 330. Likewise, the phase and magnitude information relative to the background pattern can be extracted for subsequent use in verifying authenticity of a captured image of a target authentication device in a similar manner by using the extracted phase and/or magnitude information without loss of generality.

In this example, the phase modulation coding of the security pattern 322 is a 180° phase shift relative to the phase of the background pattern 330 and the boundary interfacing portion between the background pattern 330 and the security pattern 322 has a characteristic zigzag shape as depicted more particularly in FIGS. 3D and 3D1 which show the excerpted portion 312 of FIG. 3 in more detail for comparison with the details of the background pattern as depicted in FIGS. 3E and 3E1.

Figure 4:
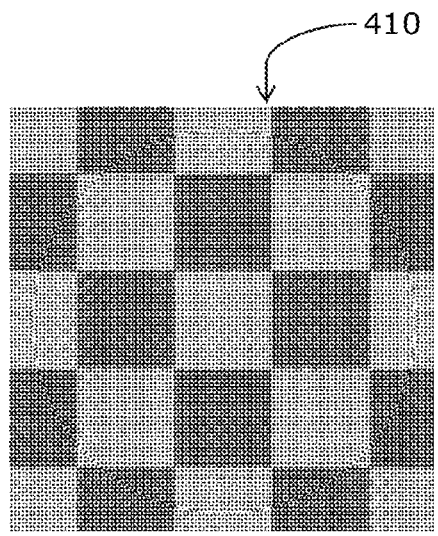
FIG. 4 depicts a fourth example authentication device.
Figure 4A:
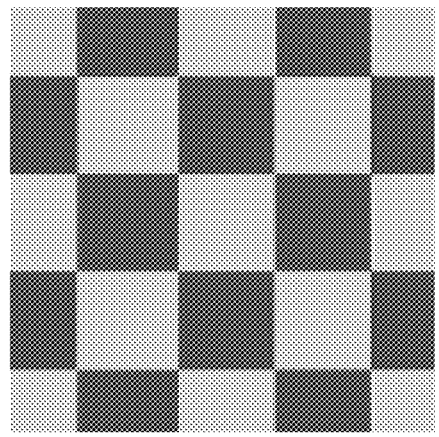
FIG. 4A depicts an example background pattern embedded in the authentication device of FIG. 4.
Figure 4B:
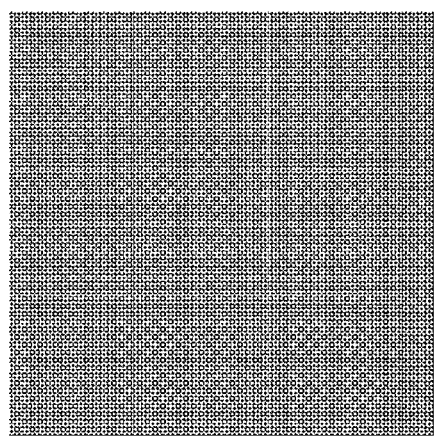
FIG. 4B depicts an intermediate-security device to be integrated into the background pattern of FIG. 4A to form the authentication device of FIG. 4.
Figure 4C:
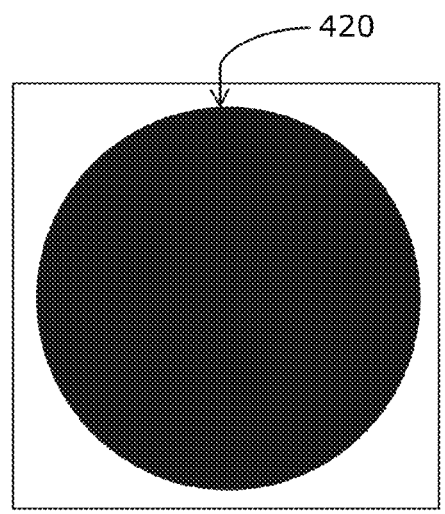
FIG. 4C is a graphical representation of the frequency domain data of the background pattern of FIG. 4A.
Figure 4C:
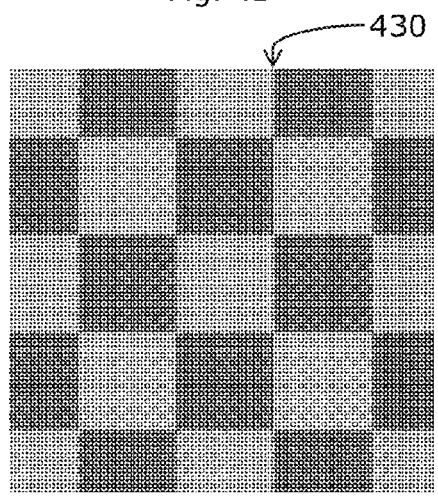
Figure 4C:
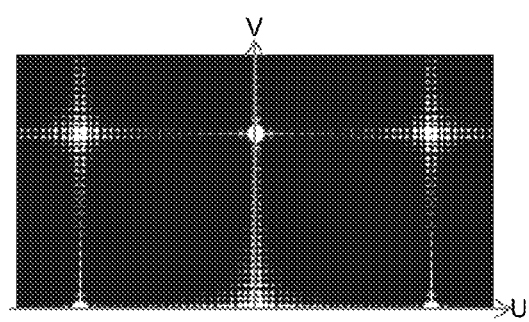
Figure 4D:
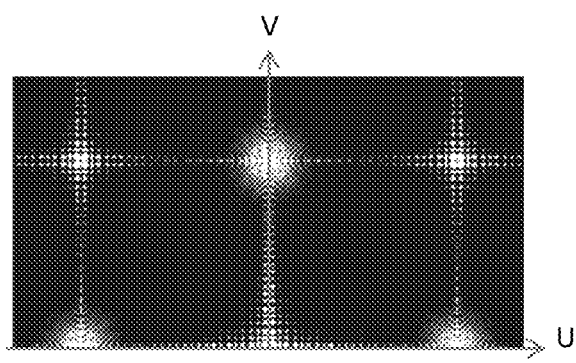
FIG. 4D is a graphical representation of the frequency domain data of the authentication device of FIG. 4.

A fourth example authentication device 410 of FIG. 4 is formed by integration of a security device 420 of FIG. 4B1 into a background pattern 430 of FIG. 4B2. The background pattern 430 is a result of superposition or merging of two background patterns, namely the background pattern FIG. 4B and a checker board pattern of FIG. 4A. The background pattern 430 has a frequency domain representation as depicted in FIG. 4C, and a frequency domain representation of the authentication device 410 is depicted in FIG. 4D. The frequency domain data of the authentication device 410 are due to that of the background pattern 430 and that of the security device 420 in integration.

Figure 4E:
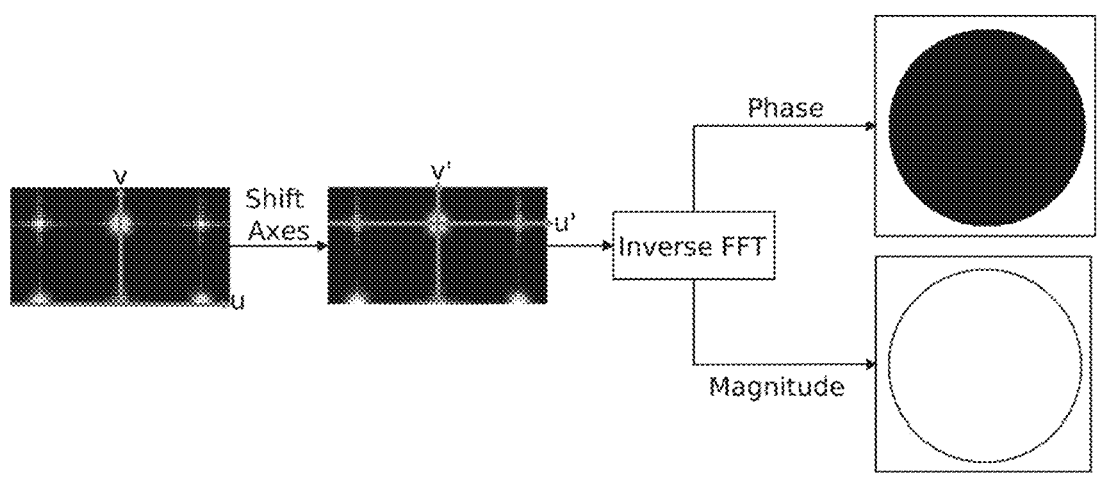
FIG. 4E is a schematic diagram depicting steps to extract relative phase and magnitude information from the authentication device of FIG. 4 by inverse Fast Fourier Transform using a reference axes shifting technique.

A process comprising shifting the reference axes such that a new origin is at the characteristic frequency plus subsequent spatial domain transformation of the relative frequency data by inverse FFT as depicted in FIG. 4E. This process is used to extract characteristic data of the security device for verification. The resultant phase and magnitude data as presented in FIG. 4E correspond respectively to the area and outline of the security device 420. Although the new axes are not shifted to the frequency of the checkerboard, the checkerboard pattern does not appear in the extracted phase and magnitude diagrams because the checkerboard frequency is very different to the characteristic frequency of the background pattern of FIG. 4B.

FIG. 5 depicts an example authentication apparatus 10 incorporating example implementation of the above authentication methods. The authentication apparatus 10 comprises an image capturing device 12 such as a CCD device, a processor 14, a memory 16 and a display 18. The processor can be a standalone microprocessor or a cluster of microprocessors. The display is for example an LCD display such as a touch screen display but can be other displays such as an image output or a built-in projector. A set of instructions for operating the authentication apparatus is stored in the memory. The display also includes a visual guide 20 to help alignment of a target authentication device with an alignment frame for accuracy capturing. The operating instructions may include instructions to operate the image capturing device to capture an image of a target authentication device and to store the captured image as pixels in the memory, instructions to transform the pixel data into frequency domain data, instructions to transform the frequency domain data with reference to a new frequency origin corresponding to a characteristic frequency determined by the background pattern of an authentication device, instructions to perform inverse FFT whereby the relative frequency domain data are transformed into the spatial domain, instructions to extract phase and magnitude data from the inverse FFT transformed data to reconstruct characteristics of the security device for verification, instructions to cause the reconstructed characteristics for display, and/or displaying the reconstructed characteristics on the display for human interface.

In an embodiment, the authentication device is a mobile telecommunication device such as a smart phone, a tablet computer or a note book computer, such that the instructions can be downloaded in the form of application software or 'Apps' from time to time according to the specifications of an individual authentication device. Alternatively, the instructions can be made available as firmware or integrated circuits such as ASIC.

An example operation of the authentication apparatus of FIG. 5 will be described with reference to FIGS. 5A to 5C.

When it is needed to verify the authenticity of an authentication device such as 110, 210, 310, 410 or the like, a user will activate the apparatus and aim the image capturing device of the authentication apparatus at a target authentication device as depicted in FIG. 5A. The user will operate the apparatus to capture an image of the aligned target authentication device when an image of the target authentication device is aligned with the alignment frame 20. The captured image will be stored as pixel data in the memory and the processor will transform the spatial domain pixel data into frequency domain data by FFT or DFT. After the frequency domain data is obtained, the processor will transform the frequency domain data by shifting the reference frequency axes to the characteristic frequency of the background pattern such that the new frequency origin is at the dominant frequency. After this frequency translation has been performed, the relative frequency domain data will be re-transformed into the spatial domain by inverse FFT. The translated frequency domain data is termed 'relative frequency domain data' because the frequency origin has been shifted to be with respect to the dominant frequency. The magnitude and phase information or data obtained by inverse FFT transform are then used to perform comparison with pre-stored characteristics of a reference security device. For example, the phase data may be used to obtain information on the region of the security device while the magnitude data can be used to extract an outline of the target security device for verification. The verification may be by correlation, by template matching or other comparison algorithms without loss of generality. A visual representation of the target security device may be shown on the display 18 as depicted in FIG. 5B to provide perceivable information of the target security device to assist a user.

In an example, after the moiré pattern has been extracted, the apparatus running an application complying an authentication algorithm ('APPS') may examine the intensity or quality of the pattern for authentication.

In an example graphic representation of an authentication process using the authentication apparatus of FIG. 5, the security device is an English word 'REAL'. A visual representation of a pre-stored image of the security device is displayed alongside a visual representation of the security device extracted according to the methods described herein. A graphical interface on the display also informs an user that the security device extracted from an image of the target authentication device is genuine by a textual message 'Success'.

While the above illustrates an example application of the authentication method, it will be appreciated that the authentication methods can be implemented in different ways or manners without loss of generality. For example, an image of the authentication device can be captured by a mobile front end and then sent to a remote server for verification.

Furthermore, while the background patterns used in the above examples comprises either of periodic dots or lines, it will be appreciated that the background patterns may consists of any predefined letters, digits or any symbols such as country emblems, currency signs, etc. Moreover, while the background patterns above use monotone dark dots as the pattern defining elements on a plain background, it will be appreciated that the pattern defining elements can be at a halftone level or in colour. Furthermore, while the examples above are illustrated with a background pattern having black dots or lines on a plain background, the method apply equally well to background patterns having white dots or lines on a black or dark background pattern with loss of generality.

The invention claimed is:

1. An authentication method for verifying authenticity of a target authentication device, wherein the target authentication device comprises a reference pattern and a security pattern, and each one of the reference pattern and the security pattern comprises pattern defining elements which are distributed according to a characteristic frequency, and the security pattern comprises an embedded security device that is coded with predetermined relative phase modulation information of the characteristic frequency with respect to phase of the reference pattern; and wherein the method comprises: obtaining frequency domain data from spatial domain pixel data of an image of the target authentication device; digitally filtering the characteristic frequency; and extracting said predetermined relative phase modulation information comprising information on relative phase shift between the security pattern and the reference pattern to construct characteristic features of the security device for verification of authenticity of the target authentication device.

2. An authentication method according to claim 1, wherein the method comprises transforming spatial domain pixel data of an image of the authentication device into frequency domain data, and then processing the frequency domain data to extract said phase modulation data to recover characteristic features of said security device.

3. An authentication method according to claim 2, wherein the method comprises extracting the relative phase shift from said frequency domain data to facilitate verification of authenticity.

4. An authentication method according to claim 1, wherein the method comprises offsetting the frequency domain data by the characteristic frequency, inverse transforming the frequency domain data back into spatial domain data after the characteristic frequency offset, and then extracting phase information and/or magnitude information from said spatial domain data to facilitate verification of authenticity.

5. An authentication method according to claim 4, wherein the method comprises processing the extracted phase information and/or the extracted magnitude information to obtain characteristic features of said security device to facilitate verification of authenticity.

6. An authentication method according to claim 4, wherein the method comprises processing the extracted phase information and/or the extracted magnitude information to extract characteristic features of the security device and devise a visible representation of the characteristic features of said security device for display.

7. An authentication method according to claim 1, wherein the method comprises devising a visible representation of the characteristic features of said security device, the visible representation comprising a visible outline of said security device from the extracted phase information for display and/or a visible filled pattern of said security device from the extracted magnitude information for display.

8. An authentication method according to claim 7, wherein the authentication device comprises pattern defining elements which are distributed to collectively define the characteristic frequency and the visible representation of the characteristic features of said security device is substantially free of the pattern defining elements.

9. An authentication method according to claim 1, wherein the security pattern and the reference pattern are in abutment, and the abutment delineates a boundary interfacing resembling a moiré pattern.

10. An authentication apparatus comprising a processor, a memory and a display, wherein the processor is a microprocessor which is to process an image of a target authentication device to verify authenticity, wherein the target authentication device comprises a reference pattern and a security pattern separated from the security pattern, and each of the reference pattern and the security pattern comprises pattern defining elements which are distributed according to a characteristic frequency, and the security pattern comprises an embedded security device coded with predetermined relative phase modulation information of the characteristic frequency with respect to phase of the reference pattern; and wherein the processor is configured to: obtain frequency domain data from an image of the target authentication device; digitally filter the characteristic frequency; and extract said predetermined relative phase modulation information comprising information on relative phase shift between the security pattern and the reference pattern to construct characteristic features of the security device to facilitate verification of authenticity of the target authentication device.

11. An authentication apparatus according to claim 10, wherein the processor is to transform spatial domain pixel data of an image of the authentication device into frequency domain data, and then to process the frequency domain data to extract said phase modulation data to recover characteristic features of said security device.

12. An authentication apparatus according to claim 11, wherein the processor is to extract the relative phase shift from said frequency domain data to facilitate verification of authenticity.

13. An authentication apparatus according to claim 10, wherein the processor is to offset the frequency domain data by the characteristic frequency, to inverse transform the frequency domain data back into spatial domain data after the characteristic frequency offset, and then to extract phase information and/or magnitude information from said spatial domain data to facilitate verification of authenticity.

14. An authentication apparatus according to claim 13, wherein the processor is to process the extracted phase information and/or the extracted magnitude information to obtain characteristic features of said security device to facilitate verification of authenticity.

15. An authentication apparatus according to claim 13, wherein the apparatus is to process the extracted phase information and/or the extracted magnitude information to extract the characteristic features of the security device and devise a visible representation of said security device for display.

16. An authentication apparatus according to claim 10, wherein the processor is to devise a visible outline of said security device from the extracted phase information for display and/or to devise a visible filled pattern of said security device from the extracted magnitude information for display.

17. An authentication apparatus according to claim 16, wherein the authentication device comprises pattern defining elements which are distributed to collectively define the characteristic frequency, and the processor is to devise a visible representation which is substantially free of the pattern defining elements.

18. An authentication apparatus according to claim 10, wherein the security pattern and the reference pattern are in abutment and separated by a boundary, and the abutment delineates a boundary interfacing resembling a moiré pattern.

\* \* \* \* \*